United States Patent [19]

Frydman

[11] Patent Number: 4,691,644
[45] Date of Patent: Sep. 8, 1987

[54] FRAME STRUCTURE ESPECIALLY FOR A CABINET, E.G. OF THE SHELVED TYPE

[76] Inventor: Georges Frydman, 70 avenue Auguste Galtier, 06230 Villefranche-sur-Mer, France

[21] Appl. No.: 794,439

[22] Filed: Nov. 4, 1985

Related U.S. Application Data

[63] Continuation of Ser. No. 532,610, Sep. 15, 1983, abandoned.

[30] Foreign Application Priority Data

Sep. 20, 1982 [FR] France ................ 82 15799

[51] Int. Cl.⁴ ............................................. A47B 47/00
[52] U.S. Cl. .................................... 108/111; 108/155; 108/156; 108/159; 312/257 SK; 403/262
[58] Field of Search ............... 108/111, 155, 156, 157, 108/159; 211/182; 312/257 SK, 265; 403/262

[56] References Cited

U.S. PATENT DOCUMENTS

| | | | |
|---|---|---|---|
| 2,703,419 | 1/1956 | Watrous et al. | 108/156 |
| 2,783,112 | 2/1957 | Slater | 108/156 |
| 3,045,834 | 7/1962 | Seiz | 211/182 X |
| 3,534,517 | 10/1970 | Kann | 108/111 X |
| 3,736,035 | 5/1973 | Brown et al. | 312/257 SK X |
| 4,045,104 | 8/1977 | Peterson | 211/182 X |
| 4,098,197 | 7/1978 | Jorgenson | 108/111 X |
| 4,110,052 | 8/1978 | Polvara | 108/111 X |

Primary Examiner—Kenneth J. Dorner
Assistant Examiner—Peter R. Brown
Attorney, Agent, or Firm—Steinberg & Raskin

[57] ABSTRACT

The invention relates to a rigid frame structure especially for a cabinet or like piece of furniture, e.g. of the shelved type comprising normally vertical uprights maintained laterally spaced from one another by normally horizontal lateral yokes, and longitudinally spaced by normally horizontal longitudinal cross-members, and characterized in that the yokes are provided with externally protruding tenons arranged substantially in the longitudinal plane of the yoke and substantially perpendicularly to the longitudinal edges of the yoke, which tenons are intended to be inserted or fitted, preferably with a tight fit, into corresponding sockets provided at the end of the vertical uprights.

This structure offers great simplicity of assembly.

18 Claims, 4 Drawing Figures

4,691,644

FRAME STRUCTURE ESPECIALLY FOR A CABINET, E.G. OF THE SHELVED TYPE

This is a continuation of application Ser. No. 532,610, filed 9/15/83, now abandoned.

BACKGROUND OF THE INVENTION

The present invention has essentially for a subject matter a rigid frame device especially for a piece of furniture such as a cabinet, e.g. of the shelved type, or any other internal architecture element.

There are already known various rigid frame structures especially for cabinets or the like, e.g. of the shelved type, but all the known structures suffer from the drawback of being difficult to assemble and also of being in certain cases rather heavy, so that their assembly must be performed by specialized persons, or, in any case, unskilled users meet with great difficulties in assembling such known structures.

SUMMARY OF THE INVENTION

The present invention therefore has a purpose to obviate the drawbacks of the known structures by providing a solution ensuring great simplicity of assembly for even unskilled users. Preferably, this solution must also provide an extremely light structure in order to facilitate the handling of the elements for the manufacture, the transport as well as the assembly by the user.

This solution consists according to the present invention of a rigid frame structure especially for a cabinet or like piece of furniture, e.g. of the shelved type, comprising normally vertical uprights maintained laterally spaced from one another by normally horizontal lateral yokes, and longitudinally spaced by normally horizontal longitudinal cross-members, characterized in that the said yokes are provided with externally protruding tenons arranged substantially in the longitudinal plane of the yoke and substantially perpendicularly to the longitudinal edges of the yoke, the said tenons being intended to be inserted or fitted preferably with a tight fit into corresponding sockets provided at the end of the vertical uprights.

Thus, the assembly of two vertical uprights with two lateral yokes forms a rigid frame substantially rectangular or possibly square in shape.

According to a particular feature of the invention, the tenons are arranged inwardly of the lateral edges of the yoke so that after a tenon is fitted into a vertical upright, the lateral edge of the yoke extends in prolongation of the external edge of the vertical upright.

According to a particularly advantageous feature of the invention, the longitudinal cross-members are provided at their ends with brackets arranged perpendicularly to the longitudinal plane of the cross-member and which, in the assembled position, are fitted into associated cavities provided in each face of the yokes in proximity to its lateral edges, in which cavities the brackets are secured by any appropriate means, whereas, preferably, in the assembled position, the brackets are directed inwardly of the structure with respect to the longitudinal cross-members.

Other purposes, features and advantages of the invention will appear more clearly from the following explanatory description made with reference to the appended drawings illustrating one presently preferred form of embodiment of the invention and wherein:

DETAILED DESCRIPTION OF THE PREFERRED EMBODIMENTS

Figure 1:
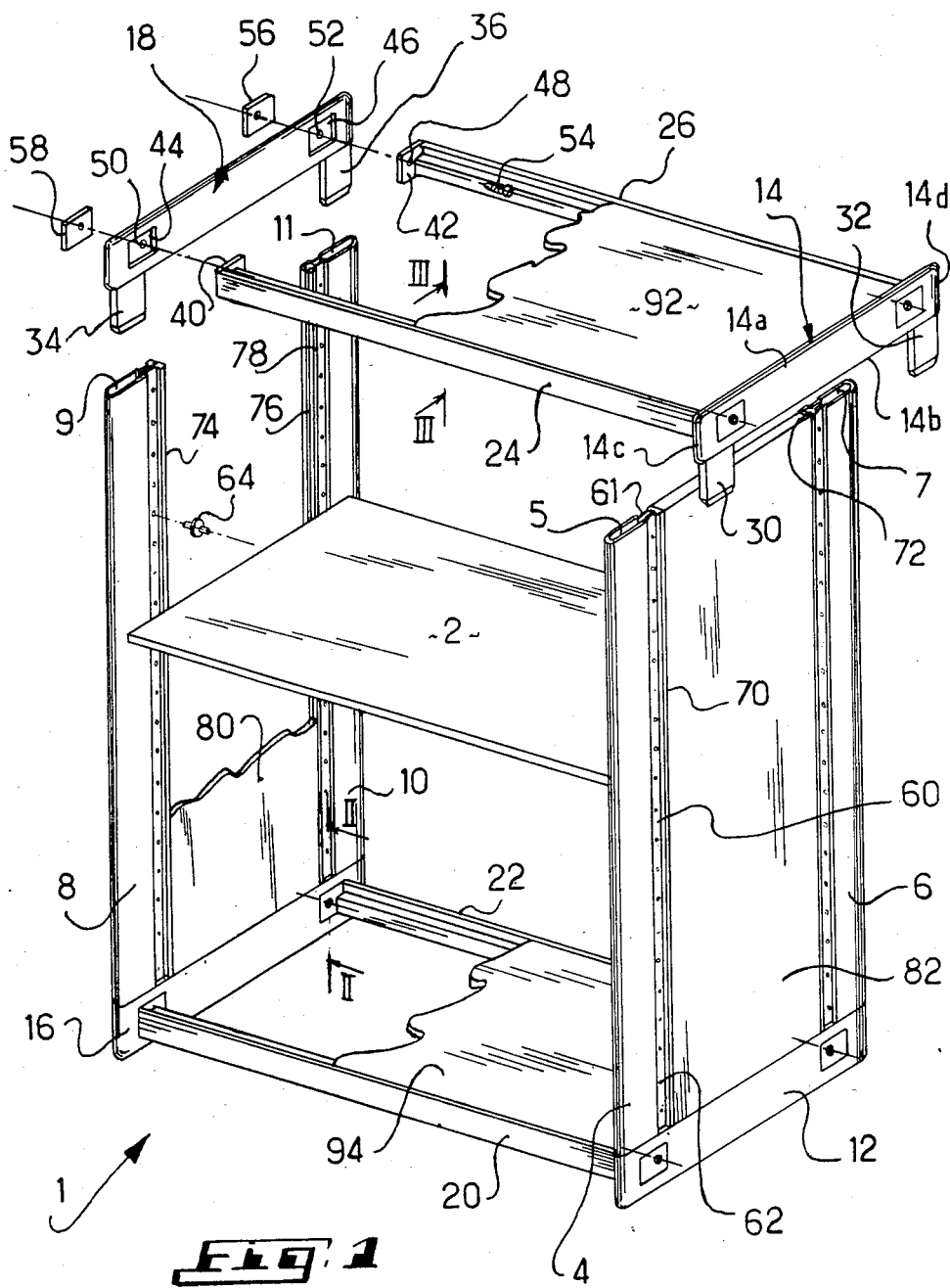
FIG. 1 is a perspective, partially exploded and partially broken-away view of a rigid frame structure according to the present invention, the assembly of which is practically completed with the exception of the assembly of the upper yokes and the upper longitudinal cross-members.

Referring to FIGS. 1 to 4, a rigid frame structure 1, especially for a cabinet or like piece of furniture, e.g. with a shelving 2, comprises normally vertical uprights 4,6,8,10 maintained laterally spaced from one another by normally horizontal yokes 12,14,16,18 and longitudinally spaced by normally horizontal longitudinal cross-members 20,22,24,26.

According to the invention, the yokes 12,14,16,18 are provided with externally protruding tenons or lugs 30,32, 34,36 arranged substantially in the longitudinal plane of the yoke and substantially perpendicularly to the longitudinal edges such as 14a,14b of the yoke. The tenons such as 30,32,34,36 are intended to be inserted or fitted, preferably with a tight fit, into corresponding sockets such as 5,7,9,11 provided at the end of the vertical uprights 4,6,8,10, respectively.

According to a particular feature of the invention, the tenons such as 30,32,34,36 are arranged inwardly of the lateral edges, e.g. 14c,14d, of the yoke 14, so that after a tenon is fitted into a vertical upright, the lateral edge of the yoke extends in prolongation of the external edge of the vertical upright, as seen clearly in FIG. 1 for the lower portion of the structure represented in the assembled state.

According to another particularly advantageous feature of the structure of the invention, the longitudinal cross-members 20,22,24,26 are provided at their ends with brackets such as 40,42, arranged perpendicularly to the longitudinal plane of the cross-member (24,26, respectively), which, in the assembled position, are fitted into associated cavities such as 44,46 provided on each longitudinal face of the yokes 14,18, in proximity to its lateral edges such as 14c, 14d, as appears clearly from FIG. 1.

The brackets such as 40,42 are secured in the associated cavities such as 44,46 by any appropriate means. For example, according to the form of embodiment illustrated, the brackets such as 40,42 and the cavities such as 44,46 are provided with holes, the visible ones of which are numbered 48,50,52, extending right through them from side to side and allowing the insertion of screws such as 54 co-operating for example with anchor-plates such as 56,58 which also are suitably shaped to fit into the cavity provided on the yoke face opposite the one to which is secured the cross-member.

Advantageously, the vertical uprights 4,6,8,10 are constituted by shaped tubes approximately rectangular in cross-section, the open ends of which define the sockets 5,7,9,11 receiving the tenons such as 30,32,34,36 of the yokes.

According to a particular feature of these vertical uprights, the lateral faces of the latter are provided, preferably towards the internal edge of the vertical upright, with two vertical grooves, for example 60,61 for the vertical upright 4, all the vertical uprights being identical. Each vertical groove, for example 60,61, is provided with accessory fixing means 62 such as supporting pins 62 for the shelves 2, hinges for solid or glazed doors drawer slides, pivot pins for flaps or various iron fittings. These means may be for example, in the case of accessories consisting of supporting pins, regularly spaced holes or appropriately shaped portions allowing the sliding of a tapped plate to obtain the fixing of the aforesaid accessories at any desired height.

According to another particular feature, the internal edge or rear face 70,72,74,76 of each vertical upright 4, 6,8,10, respectively, is provided in its thickness with a vertical slot, such as the vertical slot 78 of the upright 10 which is seen particularly clearly in FIG. 1, provided for the locking of the lateral filling panels 80,82.

Figure 4:
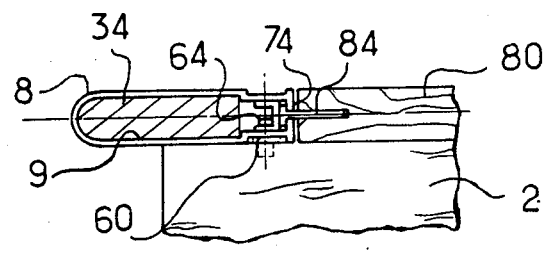
FIG. 4 is a sectional view upon IV—IV of FIG. 3.

These lateral filling panels 80,82 may be locked for example as illustrated in FIG. 4 and known per se, by the pivoting of an eccentric disc 84 located in the thickness of the panel 80 and projecting into the slot 74 from the rear face of the associated upright 8.

Figure 2:
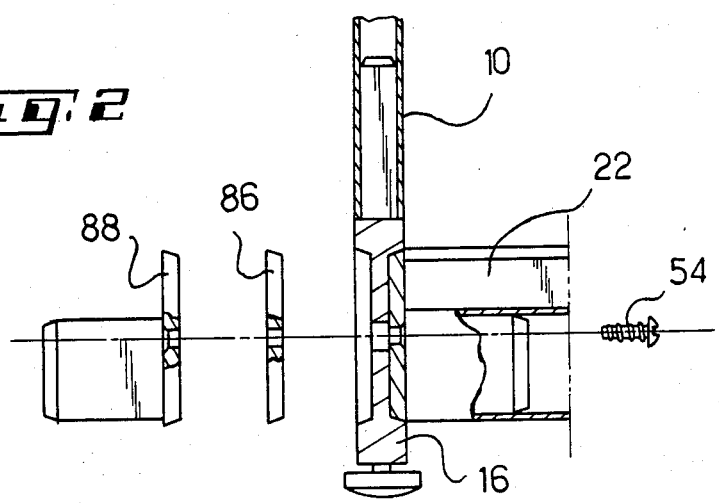
FIG. 2 is an enlarged detailed and partially sectional view upon II—II of FIG. 1.

According to another particular feature of this structure, as entirely visible in FIG. 2, the brackets and the cavities have their cooperating portions gently slanted, thus allowing a perfect locking to be obtained when they are put in place and tightened.

Referring also to FIG. 2, it will be noted that in case it is necessary to add an element to enlarge the structure, it is sufficient to unscrew the anchor-plate 86 serving as a nut and to replace it with a further longitudinal extension cross-member 88. The anchor-plate 86 then serves as a nut for fixing the newly placed frame.

Figure 3:
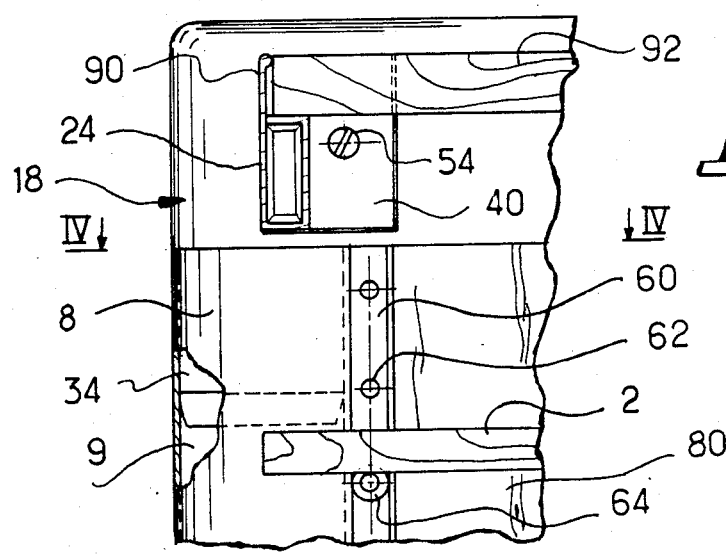
FIG. 3 is a sectional view upon III—III of FIG. 1.

On the other hand, according to still another feature of the present invention, as clearly visible in FIG. 3, the longitudinal cross-members such as 24 are constituted by hollow bars of square or rectangular cross-section, one vertical wall of which is provided with an extension 90 protruding upwardly in the assembled position, as illustrated, so as to define an L-shaped socket for accommodating a top wall 92 or a bottom wall 94 for the structure.

Thus, in some cases, a completely closed piece of furniture can be obtained.

According to other particular features, for example, the cavities such as 44,46 may be shifted inwardly of the structure with respect to the associated tenons 34,36. On the other hand, all the elements forming the structure, i.e. the uprights, the yokes and the cross-members, are made by drawing, extrusion or moulding, e.g. injection moulding, and are thus advantageously made of plastics material or of light alloy or of any other suitable material.

Lastly, the external vertical edge of each vertical upright may have various shapes, e.g. half-round or rounded, flat, ovoidal or with a hollow slot, so as to obtain a particularly pleasant external appearance.

The invention therefore comprises all means constituting technical equivalents to the means described as well as their combinations.

What is claimed is:

1. A rigid frame structure especially for a cabinet or like piece of furniture, e.g. of the shelved type, comprising normally vertical uprights maintained laterally spaced from one another by single piece, normally horizontal, lateral yokes, and longitudinally-spaced, normally horizontal, longitudinal cross-members, said yokes comprising outwardly protruding tenons arranged substantially in the longitudinal plane of a respective yoke and substantially perpendicularly to the longitudinal edges of said respective yoke, said tenons adapted to be inserted or fitted into corresponding sockets provided at ends of said vertical uprights, said yokes having vertcal longitudinal faces which are each provided, in proximity to the lateral edges of said yokes, with assembling means for assembling said longitudinal cross-members on said vertical longitudinal faces of said yokes, said assembling means comprising four cavities disposed on each yoke, two cavities being disposed on each vertical longitudinal face thereof, and each cavity being disposed on said vertical longiduinal face of said yoke substantially opposite to a cavity disposed on said opposite vertical longitudinal face of said yoke, whereby said cavities provide end-to-end engagement of additional cross-members for a second frame structure or alternatively, are adapted to be fitted with an end cap for an anchoring engagement.

2. A rigid frame structure according to claim 1, wherein said tenons are arranged inwardly of the lateral edges of said respective yoke, so that after a tenon is fitted into a respective vertical upright, the lateral edge of said respective yoke extends in prolongation of the outer edge of respective vertical upright.

3. A rigid frame structure according to claim 1, wherein said vertical uprights are constituted by shaped tubes of approximately rectangular cross-section, the open ends of which define said sockets for receiving said tenons of said yokes.

4. A rigid frame structure according to claim 1, wherein said uprights, yokes and cross-members are obtained by moulding.

5. A rigid frame structure according to claim 1, wherein said tenons are adapted to be inserted into said corresponding sockets with a tight fit.

6. A rigid frame structure according to claim 1, wherein said cavities are shifted inwardly with respect to said tenons.

7. A rigid frame structure according to claim 6, wherein said tenons are adapated to be inserted into said corresponding sockets with a tight fit.

8. A rigid frame structure according to claim 1, wherein said longitudinal cross-members are constituted by hollow bars of rectangular cross-section defining inner and outer walls, said outer vertical wall being provided with an extension arranged in the plane of said outer vertical wall and protruding outwardly in the assembled position so as to define an L-shaped socket for accommodating a top wall or a bottom wall of the structure.

9. A rigid frame structure according to claim 1, wherein
said lateral faces of said vertical uprights are provided with a vertical groove provided with accessory fixing means for fixing accessories, and
the internal edge or rear face of said vertical upright is provided, in the thickness thereof, with a vertical slot provided for locking lateral filling panels.

10. A rigid frame structure according to claim 9, wherein said vertical groove is provided towards the internal edge of said vertical upright.

11. A rigid frame structure according to claim 1, wherein said cavities are substantially identical in shape.

12. A rigid frame structure according to claim 11, wherein said cavities are each outwardly flared.

13. A rigid frame structure according to claim 12, additionally comprising
    bracket plates disposed at opposite ends of said longitudinal cross-members, said bracket plates each having a shape substantially complementary to the outwardly flared shape of said cavities.

14. A rigid frame structure according to claim 11, wherein said assembling means additionally comprise
    bracket plates disposed at opposite ends of said longitudinal cross-members, said bracket plates each having a shape substantially complementary to the shape of said cavities.

15. A rigid frame structure according to claim 1, additionally comprising
    a hole interconnecting said opposite cavities disposed on said opposite vertical longitudinal faces of said yoke,
    screw means for fastening a bracket plate of a longitudinal cross-member to said yoke and in a respective cavity, and
    at least one anchor plate having a substantially complementary shape to said cavities.

16. A rigid frame structure especially for a cabinet or like piece of furniture, e.g. of the shelved type, comprising normally vertical uprights maintained laterally spaced from one another by single piece, normally horizontal, lateral yokes, and longitudinally-spaced, normally horizontal, longitudinal cross-members, said yokes comprising outwardly protruding tenons arranged substantially in the longitudinal plane of a respective yoke and substantially perpendicularly to the longitudinal edges of said respective yoke, said tenons adapted to be inserted or fitted into corresponding sockets provided at ends of said vertical uprights, said yokes having vertical longitudinal faces which are each provided, in proximity to the lateral edges of said yokes, with assembling means for assembling said longitudinal cross-members on said vertical longitudinal faces of said yokes,
    said longitudinal cross-members comprising at the ends thereof, bracket plates extending substantially perpendicularly to the longitudinal axis of a respective cross-member, said assembling means comprising two cavities on the vertical longitudinal face of said yoke, each cavity being located to face the end of one of said cross-members and adapted to receive and maintain said cross-member bracket plate,
    wherein said assembling means comprise two other cavities located on the face opposite to the vertical longitudinal face of said yoke adjacent said cross-members, to provide an end-to-end engagement of additional cross-members for a second frame structure or alternatively, to be fitted with an end cap for anchoring engagement of said cross-members in said cavities of the vertical longitudinal face of said yoke adjacent said cross-members.

17. A rigid frame structure according to claim 16, wherein said bracket plates and said cavities have cooperating portions thereof gently slanted.

18. A rigid frame structure according to claim 16, wherein said bracket plates each have an inner vertical face and an outer vertical face, said outer vertical faces of said bracket plates being, in the assembled position, substantially entirely fitted into said cavities to which said bracket plates are secured, and are directed inwardly of the structure with respect to said longitudinal cross-members.

* * * * *